US008218155B2

(12) United States Patent
Kovacs

(10) Patent No.: US 8,218,155 B2
(45) Date of Patent: Jul. 10, 2012

(54) CLEAR MARKING MATERIAL PRINTING TO COMPENSATE FOR PILE HEIGHT DIFFERENTIAL

(75) Inventor: Gregory Joseph Kovacs, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1120 days.

(21) Appl. No.: 12/104,072

(22) Filed: Apr. 16, 2008

(65) Prior Publication Data

US 2009/0263172 A1 Oct. 22, 2009

(51) Int. Cl.
*G06F 3/12* (2006.01)

(52) U.S. Cl. ........ 358/1.1; 358/3.26; 358/3.27; 399/341

(58) Field of Classification Search ................. 358/3.27, 358/3.26, 1.1; 399/321, 147
See application file for complete search history.

(56) References Cited

U.S. PATENT DOCUMENTS

| | | | | |
|---|---|---|---|---|
| 5,754,302 | A | 5/1998 | Coleman | |
| 6,203,953 | B1 | 3/2001 | Dalal | |
| 6,539,191 | B2 * | 3/2003 | Itaya | 430/45.2 |
| 7,720,421 | B2 * | 5/2010 | Snyder | 399/321 |
| 8,075,209 | B2 * | 12/2011 | Revankar | 400/614 |
| 2006/0132519 | A1 | 6/2006 | Kovacs | |
| 2006/0291930 | A1 * | 12/2006 | Moore | 399/384 |
| 2007/0059616 | A1 | 3/2007 | Mishra et al. | |
| 2009/0194926 | A1 * | 8/2009 | Mandel | 270/5.02 |
| 2009/0245911 | A1 * | 10/2009 | Revankar | 400/583 |

* cited by examiner

*Primary Examiner* — King Poon
*Assistant Examiner* — Lawrence Wills
(74) *Attorney, Agent, or Firm* — Maginot, Moore & Beck, LLP

(57) ABSTRACT

A method of printing an image on a substrate comprises determining a pile height differential for the image. A clear marking material is added to the image printed on the substrate in response to the determined pile height differential. Adding the clear marking material substantially reduces the pile height differential between two areas of the printed image. The clear marking material may be a clear ink or a clear toner material. The substrate on which the image is printed may comprise a plurality of sheets, a roll or other length of print media. The step of adding clear marking material to the image may include substantially leveling the printed image using the clear marking material. In at least one alternative embodiment, the step of adding clear marking material to the image includes adding at least one patch of clear marking material to the printed image.

20 Claims, 5 Drawing Sheets

CLEAR MARKING MATERIAL PRINTING TO COMPENSATE FOR PILE HEIGHT DIFFERENTIAL

FIELD

The embodiments disclosed herein relate to the field of printing and specifically to methods of compensating for pile height differentials in printed media.

BACKGROUND

Digital printing, including inkjet and electrostatic printing, is often used to produce a series of identical images on one or more substrates. Different colors of marking materials (e.g., ink or toner) typically have different pile heights that extend above the substrate. In addition, many images will have areas that include marking material and other areas that include no marking material. Therefore, pile height differentials are typically encountered across an image printed on the substrate. When an image is printed repeatedly, the pile height differentials add up as the printed images accumulate in an output area. The accumulated pile height differentials can lead to distortions in the output media (e.g., a roll or stack of media) and these distortions may cause disruptions in subsequent workflow operations.

One example of a situation where pile height differentials may cause disruptions is with roll-to-roll printing applications. The roll-to-roll format is commonly used for printing on flexible packaging substrates, such as films and foils, which are subsequently used downstream for food packaging and other packaging applications. With roll-to-roll printing, a length of media in the form of a print substrate is fed from an input roll to a printing device. The printing device prints images on the substrate and the substrate is then fed to an output roll. When the thickness of the layer of marking material printed on the substrate is substantial (e.g., the thickness of the ink layer approaches the thickness of the substrate), it can introduce distortion to the output roll which may disrupt normal operations. In particular, if the cumulative pile height of the marking material is not relatively consistent across the roll, one side or a portion of the output roll may become unbalanced. For example, if an image printed on the right side of a substrate contains substantial print content, while the image printed on the left side of the substrate contains only limited print content, the right side of the substrate will have a greater cumulative pile height over time, and the right side of the output roll will end up with a greater diameter than the left side of the output roll. In addition, the right side of the roll will tend to be taut while the left side of the roll will tend to be loose. When the same or similar image is repeatedly printed, as is typically the case with roll-to-roll printing, this repetition only magnifies the pile height problem at the output roll. Distortion in the output roll creates problems during both the printing process and downstream in the packaging process.

Another example of a situation where pile height differentials may cause disruptions is with sheet stacking applications. In sheet stacking applications, the same image may be printed repeatedly on sheet after sheet. If a regular and relatively large pile height differential is found on a specific part of each page, the stack of sheets output from the printing device may be distorted as the pages accumulate in the output stack. For example, if the pile height on the right side of each page is relatively high, while the pile height on the left side of each page is relatively low, the stack of pages will become unbalanced, with the right side of the output stack higher than the left side. This distorted output stack situation may be even more pronounced when the print substrate is relatively thin in a sheet stacking application, as is often the case with books or catalogues. Distortion in the output stack may eventually create problems with subsequent workflow, such as when the stack of pages needs to be handled or otherwise manipulated after printing. Binding the stack of pages into a book or catalogue can be particularly difficult if the height of the stack is higher on one side of the sheets than on the other, or if the height of the stack is generally uneven across the sheets.

In view of the foregoing, it would be advantageous to provide a method of printing images to compensate for pile height differentials.

SUMMARY

A method of printing an image on a substrate comprises determining a pile height differential for the image. A clear marking material is added to the image when the image is printed on the substrate in response to the determined pile height differential. Adding the clear marking material substantially reduces the pile height differential between two areas of the printed image. The clear marking material may be, for example, a transparent ink or transparent toner particles. The substrate on which the image is printed may comprise a plurality of sheets of print media. Alternatively, the substrate may comprise a roll or other length of print media.

In at least one embodiment, the step of determining the pile height differential comprises estimating a pile height profile for the image and calculating a pile height differential between at least two areas of the image based on the estimated pile height profile for the image.

In at least one embodiment, the step of adding clear marking material to the image includes, for example, substantially leveling the printed image using the clear marking material such that pile height differentials are substantially removed from the printed image. Alternatively, the step of adding clear marking material to the image may include, for example, adding at least one patch of clear marking material to the printed image. The patch of clear marking material has a pile height configured to reduce pile height differentials between a first portion of the image and a second portion of the image. In this manner, the patch of clear marking material is configured to reduce distortions in the media at a media output location. The patch of clear marking material may be added in a periodic manner or a substantially constant manner on the media. Furthermore, the patch of clear marking material may be printed directly on the media or over colored existing material already printed on the media.

The above described features and advantages, as well as others, will become more readily apparent to those of ordinary skill in the art by reference to the following detailed description and accompanying drawings. While it would be desirable to provide a method of printing images that provides one or more of these or other advantageous features as may be apparent to those reviewing this disclosure, the teachings disclosed herein extend to those embodiments which fall within the scope of the appended claims, regardless of whether they include or accomplish one or more of the above-mentioned advantages or features.

DESCRIPTION

Figure 1:
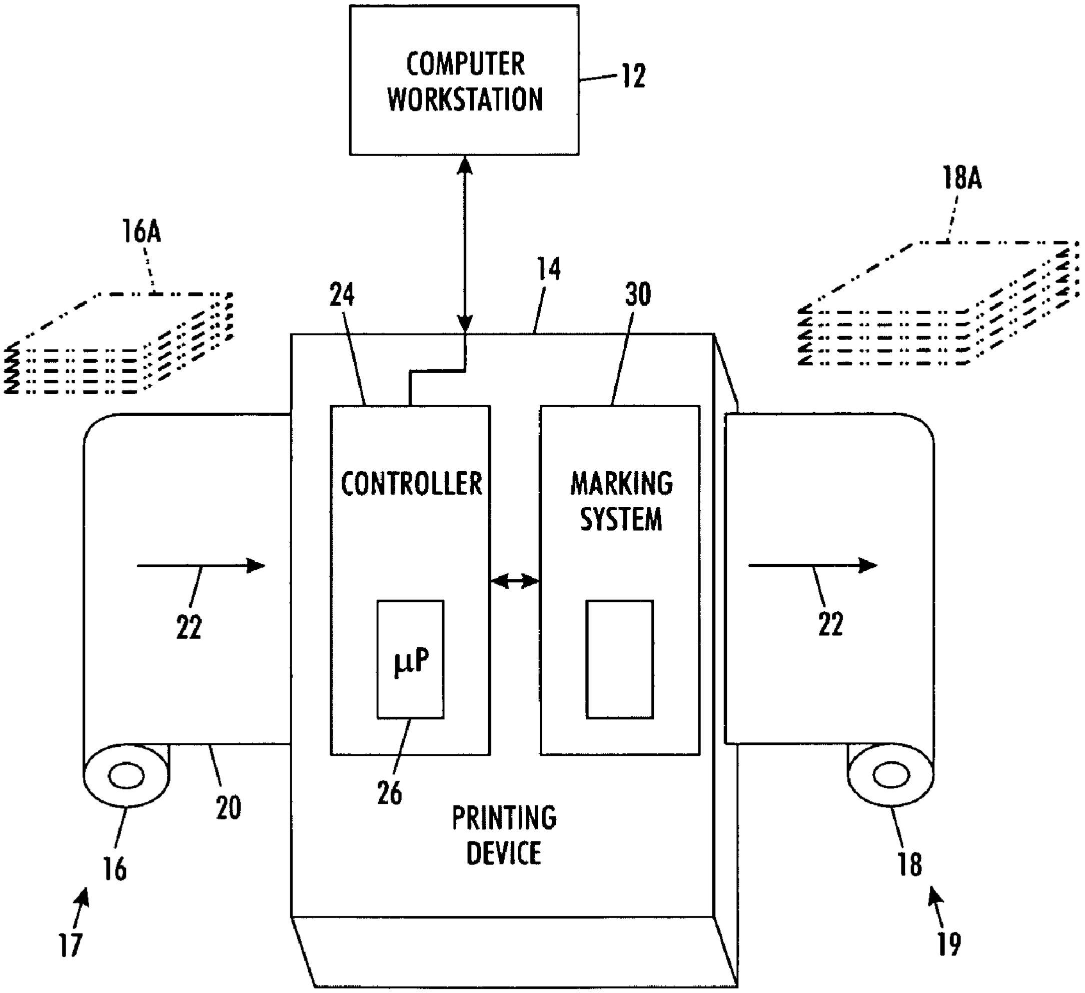
FIG. 1 shows a roll-to-roll printing application configured to compensate for pile height differential.

With reference to FIG. 1, a printing system 10 configured to compensate for pile height differentials is shown. The printing system 10 may be a roll-to-roll printing system as shown by input roll 16 and output roll 18. Alternatively, the printing system 10 may be a sheet printing system as represented in dotted lines by input sheet stack 16A and output sheet stack 18A. It will be understood that embodiments of the printing system described as a roll-to-roll printing system may alternatively be provided as a sheet printing system, and vice-versa.

The printing system 10 includes a computer workstation 12, a printing device 14, input media 16 (or 16A), and output media 18 (or 18A). The input media 16 is fed from a media input location/station 17 to the printing device in a feed direction 22. After the printing device 14 prints images on the substrate 20, the substrate is fed to a media output location/station 19.

One or more images to be printed repeatedly using the printing system 10 are created and/or stored at the computer workstation 12. The computer workstation 12 also contains information about the intended layout of the images when printed on the media substrate 20. Digital packaging data, including image data and layout data, is delivered to the printing device 14 from the workstation.

The printing device 14 is a digital printer that includes a controller 24 and a marking system 30. The controller 24 comprises a processor 26 configured to process the digital packaging data received from the computer workstation 12 and instruct the marking system 30 when and where to print on the substrate 20. The marking system 30 includes the components configured to deliver marking material to the substrate. The marking material that may be delivered to the substrate includes both clear (substantially transparent) and colored marking material (including both black and white marking material, and other marking material with a substantial amount of colorant). The colored marking material is used to form the desired image on the substrate 20. The clear marking material is used to provide additional features on the substrate. One such feature provided by the clear marking material relates to compensating for pile height differentials, as described in further detail below. The marking system 30 may include, for example, a print head for delivering ink, a photosensitive imaging drum for delivering toner, or other device configured to deliver marking material to the substrate. The term "marking material" refers to material to be placed on a substrate, such as, for example, an ink, toner, or other material. The term "colorant" refers, for example, to pigments, dyes, mixtures thereof, such as mixtures of dyes, mixtures of pigments, mixtures of dyes and pigments, and the like.

As discussed previously, at various points on the printed image, the marking material delivered to the substrate 20 will have a certain pile height which rises above the surface of the substrate 20. However, when the pile height significantly varies across an image, this significant pile height differential can result in media distortions at the media output location 19, such as distortions in the output roll 18. The controller 24 is configured to monitor pile height differentials in the printed images and mitigate the effects of such pile height differentials in the media output location by adding clear marking material to the images printed to the substrate.

In order to keep the media in the output station 19 relatively uniform and free of substantial distortions, the images printed on the media should have a relatively uniform pile height along and/or across the media. In order to maintain a relatively uniform pile height, the controller first calculates a printed height profile for the one or more images to be printed. This may be accomplished by estimating the image pile height at any location on the image. Image pile height at any pixel location may be estimated by assuming that pile height is generally constant with respect to pixel values (i.e., a pixel value for each level of color separation). For example, given an image vector at each image pixel location and/or an image value for each color separation, and given a particular printing process or device, a proportionality constant for pile height may be empirically calculated. With this information, a pixel value to pile height transformation matrix may be determined. Alternatively, a simple look-up table may be created to determine the pile height at any particular pixel location. In either case, an estimation of the pile height at any pixel location can be provided for the images printed, thus providing a pile height profile for the image.

Figure 2:
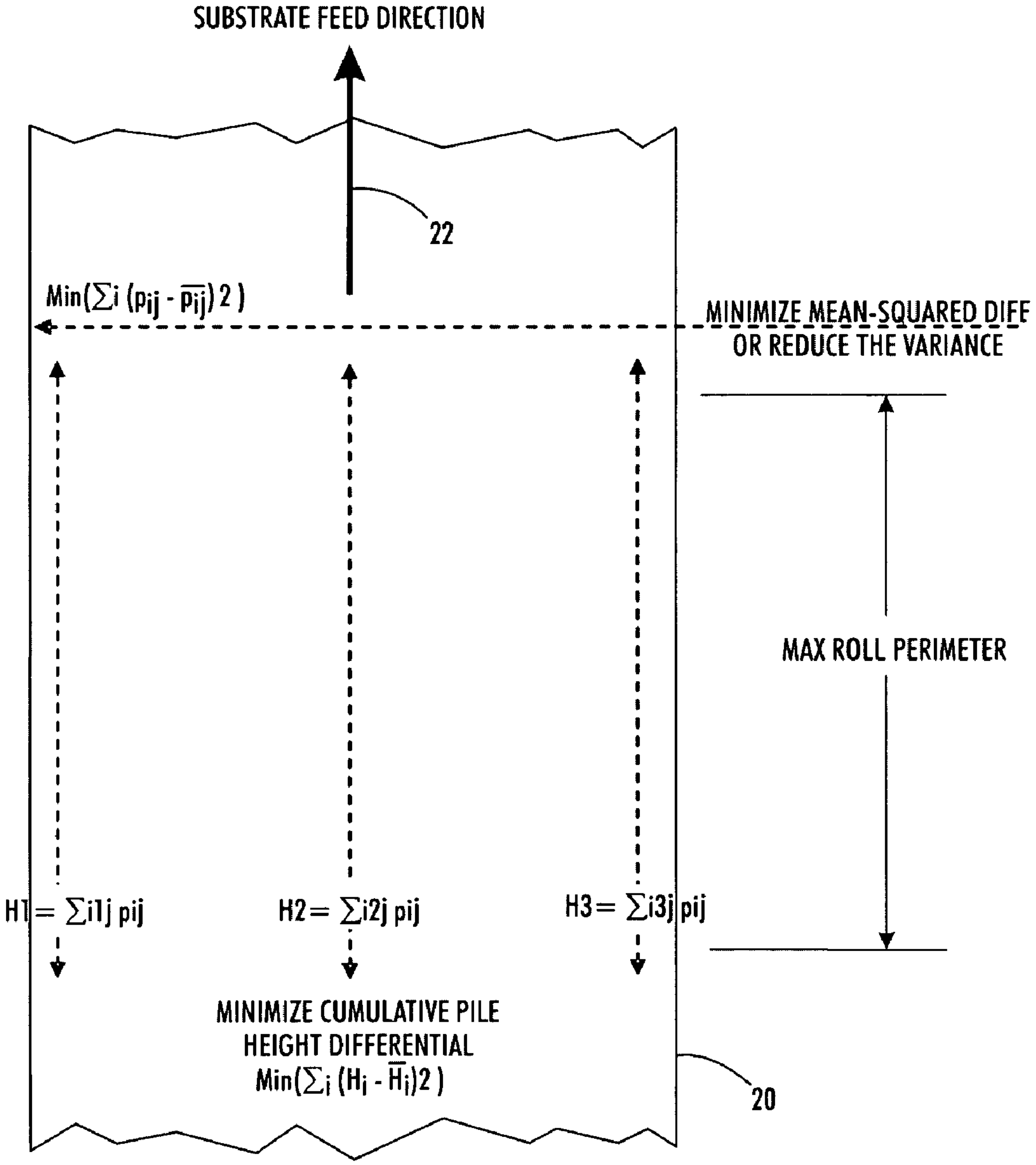
FIG. 2 is a diagram showing various calculations made by the printing device of FIG. 1 when reducing pile height differentials.

With an estimated pile height profile for an image, the controller 24 can determine a pile height differential for one or more images. The pile height differential is simply some determination that provides an indication of a difference in pile height (or cumulative pile height) at two or more different locations. A pile height differential may be determined for the one or more images in a lateral direction perpendicular to the feed direction or in a direction parallel to the feed direction. For example, as shown in FIG. 2, a mean-squared pile height differential is calculated for each line of pixels in the direction perpendicular to the feed direction (i.e., for each row of printed pixels). Thus, the controller 24 calculates the following for each printed row:

$$\Sigma_i(p_{ij}-\bar{p}_{ij})^2$$

where $P_{ij}$ is each pile height for each pixel in a row, and where $\bar{p}_{ij}$ is the average pile height for the row.

This summation value provides a pile height differential that indicates whether the pile height variance in a given row is relatively large or small. A relatively smooth row will result in a smaller summation value indicating a small pile height variance across the row. A relatively bumpy row will result in a larger summation value indicating a large pile height variance across the row. Accordingly, the controller 24 is configured to monitor whether a particular row has (or will have) a large pile height differential that could lead to output roll distortions or a small pile height differential that is less likely to lead to output roll distortions.

In addition to monitoring the pile height differential in each row, the controller 24 may also monitor the cumulative pile height differential along two or more lines parallel to the feed direction (i.e., along a plurality of columns of printed pixels). For example, if three columns of cumulative pile height are calculated, as shown in FIG. 2, the controller calculates the following:

$$H_1=\Sigma_{i1j}p_{ij}$$

$$H_2=\Sigma_{i2j}p_{ij}$$

$$H_3=\Sigma_{i3j}p_{ij}$$

where $H_i$ represents the cumulative pile height for a given column.

After calculating the cumulative pile heights, the controller then compares the cumulative pile heights to determine a cumulative pile height differential for the columns. In particular, the controller calculates a cumulative pile height differential according to the following equation:

$$\Sigma_i(H_i-{}^{-}H_i)^2$$

where ${}^{-H}{}_i$ represents the average cumulative pile height for all columns.

It will be recognized that, depending on the width of the roll, two or more points are selected for reducing the cumulative pile height. Two points (one on each edge) are selected for narrow webs and three or more points are selected if the film is thin and if the web width is large.

By calculating the pile height differential in rows and columns, the controller is able to identify portions of the printed images that include relatively large pile height differentials from other portions of the printed images. The controller then performs a minimization function on the calculated mean square differential values. This minimization function provides an indication of how clear marking material may be used on the printed images to minimize or otherwise reduce the cumulative pile height differentials and thus reduce distortions in the output roll 18 or output stack 18A. As set forth below, examples of how clear marking material may be used on the printed images include use of patches of clear marking material at various locations on the images or use of the clear marking material to substantially level the entire printed surface. The patches of clear marking material may be provided over desired images on the printed surface and/or adjacent to desired images on the printed surface.

Figure 3:
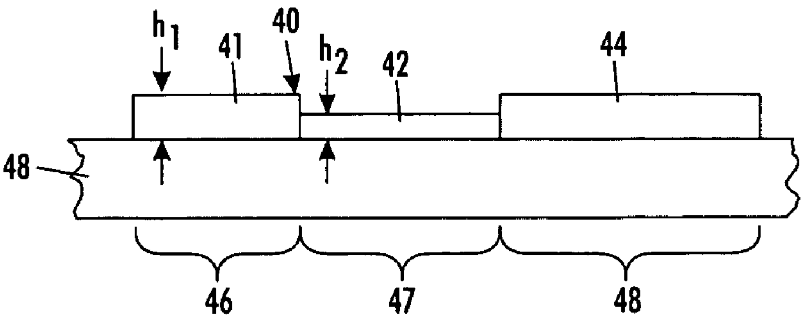
FIG. 3 shows a cross-sectional view of a substrate having an image printed thereon along with a patch of clear marking material.

With reference now to FIG. 3, a cross-sectional view of a portion of an image 40 on a substrate 20 is shown. The image 40 includes a first portion 41 of a first color having a first pile height $h_1$ in area 46 of the substrate, and a second portion 42 of a second color having a second pile height $h_2$ in area 47 of the substrate. A clear marking material 44 has been printed on area 48 of the substrate 20 such that the clear marking material is adjacent to the second portion 42 of the image 40. The clear marking material 44 has a pile height that is substantially the same as the first pile height $h_1$. Accordingly, the pile height differential on the substrate has been reduced between areas 46 and 48 of the substrate.

The clear marking material 44 shown in FIG. 3 is added as a patch printed adjacent to marking material that forms the image printed on the substrate. However, it will be recognized that the patch could also be provided over an image on the substrate. Accordingly, the area under the clear marking material in FIG. 3 could include an area of marking material with colorant, and the clear marking material 44 could be provided on top of such colored marking material to bring the pile height at area 48 up to the level shown in FIG. 3.

Figure 4:
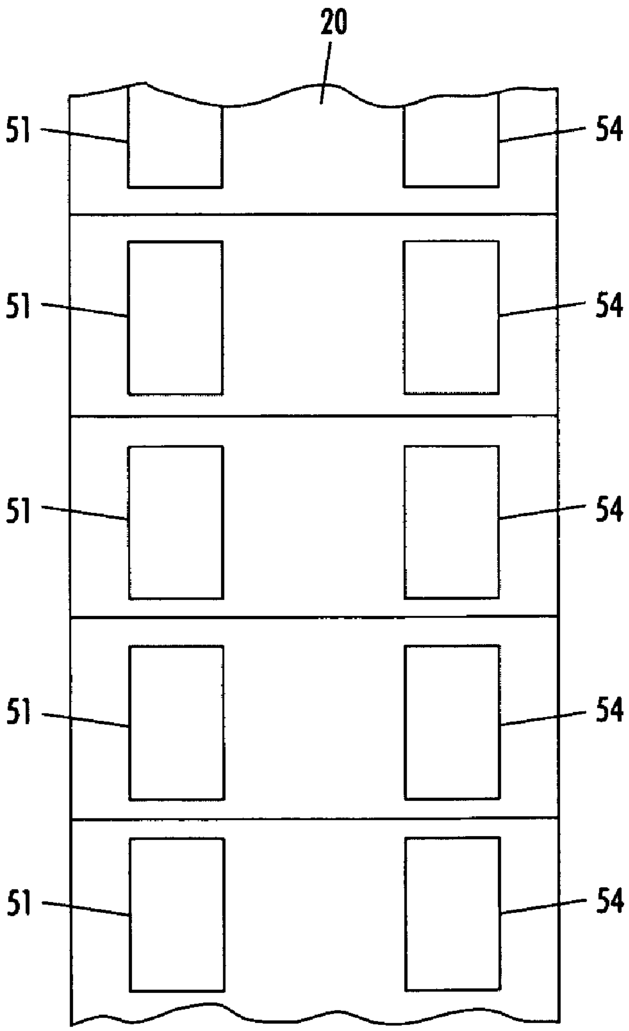
FIG. 4 shows a plan view of a substrate having a plurality of images printed thereon along with a plurality of patches of clear marking material.

The embodiment of FIG. 4 shows a plan view of a length of substrate 20 with images 51 printed repeatedly along the left side of the substrate. Patches 54 of clear marking material are provided along the right side of the substrate 20. The pile height of the patches 54 of clear marking material is substantially the same as the pile height of the images 51. Accordingly, the pile height differential between the left and right sides of the substrate is minimized, and distortions in the output roll of substrate 20 are reduced as a result of the balanced pile heights on the left and right sides of the substrate 20. Also, because the patches 54 are comprised of clear marking material, the patches 54 do not result in undesirable or unwanted images printed on the substrate. Indeed, the patches 54 of clear marking material have no significant visual effect and do not modify the printed images. Thus, even if the area under a patch 54 includes a colored image, the image remains visible and substantially unmodified since the patch material is substantially transparent.

The patches provided along the right side in FIG. 4 are printed periodically. However, in at least one alternative embodiment, the patches may also be provided as a substantially continuous length of clear marking material provided along the right side of the substrate. In either case, the cumulative pile height along the feed direction for images 51 and patches 54 will be substantially the same in order to minimize cumulative pile height differentials between the left and right sides of the substrate, thus providing a better balanced output roll than would be possible without the patches of clear marking material.

As set forth above, because the marking material added to an image in order to compensate for pile height differentials is clear, the clear marking material may be added anywhere on the image. This includes the addition of clear marking material directly on the substrate (e.g., next to colored portions as shown in FIG. 3). This also includes the addition of clear marking material on top of colored portions of an image (as shown in FIG. 5).

Figure 5:
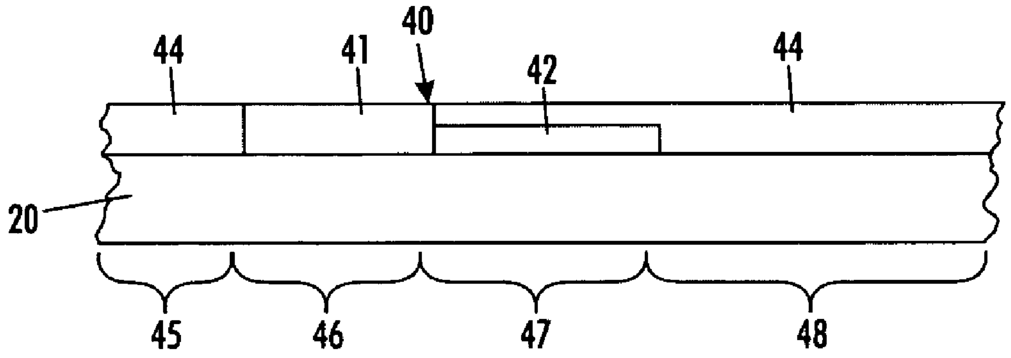
FIG. 5 shows a cross-sectional view of a substrate having an image printed thereon along with clear marking material that substantially levels the printed image such that pile height differentials are substantially removed from the printed image.

FIG. 5 shows a cross-sectional view of the same image portion 40 as shown in FIG. 3, but the clear marking material 44 in FIG. 5 has been used to substantially level the entire image. Accordingly, the clear marking material 44 is provided directly on the substrate 40 in areas 45 and 48, and is provided over the colored image portion 42 in area 47. The pile height of the clear marking material 44 is substantially the same as the pile height of portion 41. If the pile height of portion 41 is the greatest pile height for the image 40, pile height is generally leveled across the image with the pile height differentials substantially removed by the inclusion of the clear marking material 44 on the substrate 20.

Figure 6:
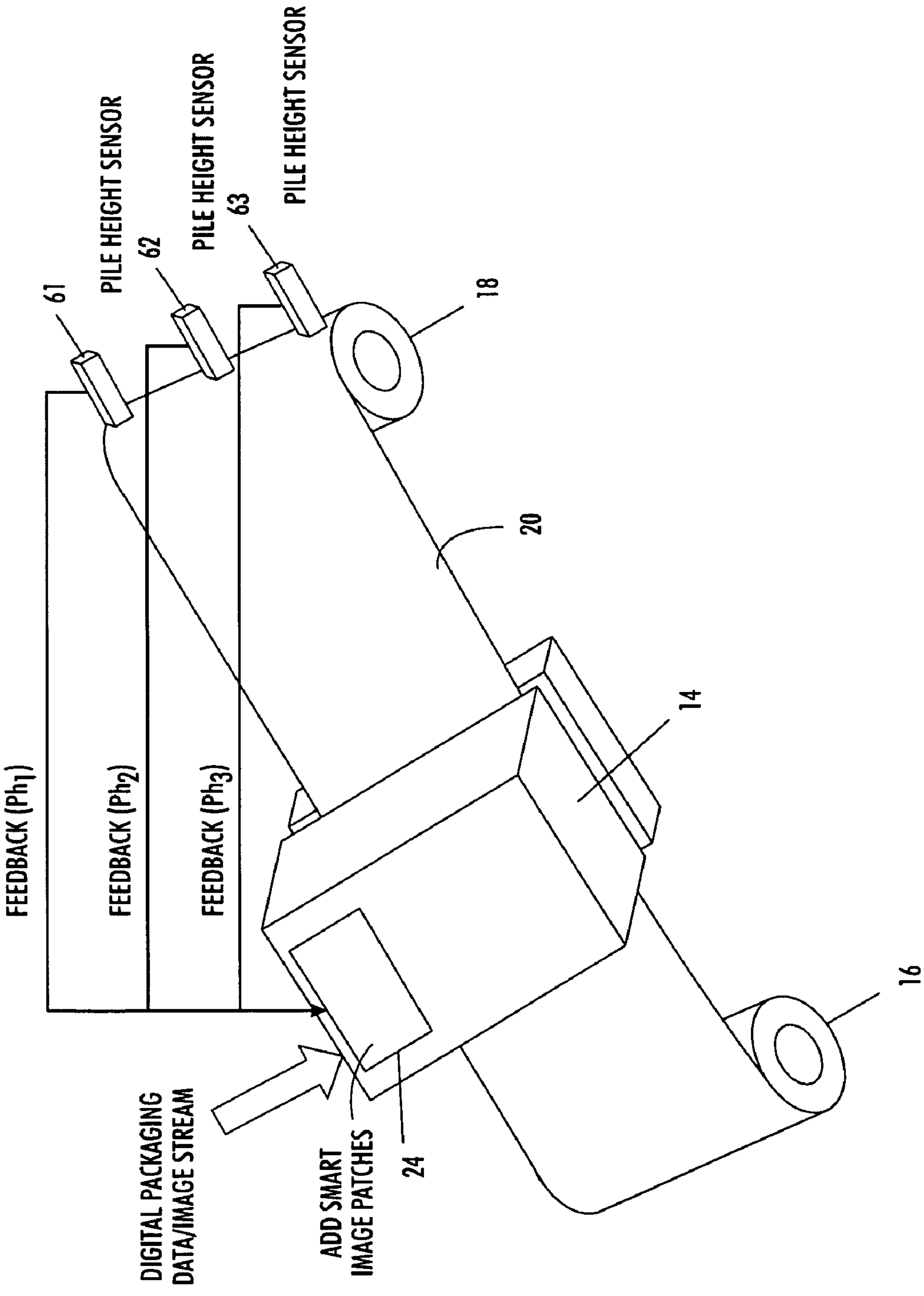
FIG. 6 shows an alternative embodiment of the roll-to-roll printing application of FIG. 1 including a plurality of pile height sensors and closed loop control.

With reference now to FIG. 6, in one embodiment the effects of pile height differentials in the printed image are mitigated by measuring the pile height at the output roll in real-time and feeding the measured pile height information back to the controller 24. Based on the measured pile height information provided to the controller 24, patches of clear marking material may be added to the printed images to minimize cumulative pile height differentials measured at the output roll.

In the embodiment of FIG. 6, pile height sensors 60 are placed on the output roll 18 to monitor the cumulative pile height at a plurality of locations of the output roll. For example, in FIG. 6, three pile height sensors 61-63 are shown, with one sensor 61 on a left side of the output role 18, one sensor 62 in the middle of the output role 18, and one sensor 63 on the right side of the output role 18. The sensors 61-63 may be, for example, mechanical sensors that physically touch the role 18 at the sensor location to determine a pile height. As another example, the sensors 61-63 may be optical sensors, such as a laser capable of measuring the pile height at the sensor location. Keyence CCD Laser Displacement Sensors (LK-G Series) are exemplary sensors that can be used for this application. Sensors of this type that are designated as "super precision" can detect height displacements as small as 0.01 microns. The thinnest substrates used for flexible packaging have a thickness of ~12 microns, and the thinnest ink layers are ~1 micron, so that the resolution of these sensors can detect small fractions of an ink layer and even much smaller fractions of the substrate thickness. This measurement capability is therefore adequate to detect the pile height differences needed to determine the thicknesses of clear layer which should be added to compensate for pile height differentials across or along the printed substrate.

Each of the sensors 61-63 measures the cumulative pile height on the roll 18 at the sensor location and outputs a measurement value. The sensor measurement values are fed back to the controller 24 as negative feedback designed to change the image pile height. The controller 24 takes the sensor measurements and calculates a patch to be added to the printed images to compensate for the cumulative pile height differential at the output roll 18. As explained above, the patch may be provided in any necessary portion of the substrate, including over existing portions of images, since the patch is comprised of a clear marking material. By virtue of sensors that feedback pile height measurements to the controller 24, the embodiment of FIG. 6 provides for closed loop control of the cumulative pile height differential at the output roll 18.

In the foregoing embodiments, the image marking material and the clear marking material are the same type of material provided from the same print device. However, in at least one alternative embodiment, a different type of marking material is used to provide the clear marking material from what is used to provide the image on the substrate. For example, if toner particles are used with an electrostatic printing process to print the image on the substrate, ink may be used from a print head to provide patches of clear ink. As another example, if an ink-jet print head is used to provide the image, clear toner particles may be used during an electrostatic printing process to substantially level the pile height across the entire image.

Although the present invention has been described with respect to certain preferred embodiments, it will be appreciated by those of skill in the art that other implementations and adaptations are possible. Furthermore, aspects of the various embodiments described herein may be combined or substituted with aspects from other features to arrive at different embodiments from those described herein. Those of skill in the art will recognize numerous other variations and combinations possible between the described embodiments. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A method of printing an image on a substrate, the method comprising the steps of:

a) determining a mean squared pile height differential for a line of pixels in the image with a controller configured to calculate the mean squared pile height differential; and b) operating a marking system to apply clear marking material to the image on the substrate with reference to the calculated mean squared pile height differential calculated by the controller.

2. The method of claim 1 wherein the clear marking material added to the substrate substantially reduces the pile height differential between two areas of the printed image.

3. The method of claim 1 wherein the clear marking material is a transparent ink.

4. The method of claim 1 wherein the clear marking material is transparent toner particles.

5. The method of claim 1 wherein the line of pixels extends in a direction perpendicular to a feed direction of the substrate.

6. The method of claim 1 wherein the line of pixels extends in a feed direction of the substrate.

7. The method of claim 1 wherein the substrate is a plurality of sheets of print media.

8. The method of claim 1 wherein the substrate is a portion of a roll of print media.

9. The method of claim 1, the step of adding clear marking material to the image further comprises:

adding the clear marking material in a substantially continuous length along at least one side of the image on the substrate.

10. The method of claim 1, the step of adding clear marking material to the image further comprises:

adding the clear marking material in patches that are periodically printed on the substrate.

11. A method of printing an image on media, the method comprising the steps of:

a) feeding the media to a printing device;

b) determining a patch of clear marking material to be printed on the media, the patch of clear marking material having a pile height calculated by a controller with reference to a mean squared pile height differential for a line of pixels in the image; and c) printing the image along with the patch of clear marking material a plurality of times on the media using the printing device.

12. The method of claim 11 wherein the media comprises a roll of media.

13. The method of claim 11 wherein the media comprises a plurality of sheets of a substrate.

14. The method of claim 11 wherein the patch of clear marking material is printed on a first portion of the image to reduce pile height differentials between the first portion of the image and a second portion of the image.

15. The method of claim 11 wherein at least a portion of the patch of clear marking material is printed over colored marking material on the media.

16. The method of claim 11 wherein the at least one patch of clear marking material substantially levels the image printed on the media to substantially remove pile height differentials from the image printed on the media.

17. A method of printing an image on media, the method comprising the steps of:

a) determining a pile height differential with a controller configured to calculate a mean squared pile height differential for a line of pixels in the image;

b) determining a position on the media for at least one patch of clear marking material, wherein determination of the position for the at least one patch is based at least in part on the determined pile height differential for the image; and c) operating a marking system to print the image and the at least one patch of clear marking material on the media with reference to the calculated mean squared pile height differential.

18. The method of claim 17 wherein the image and the at least one patch of clear marking material are printed repeatedly on the media.

19. The method of claim 17 wherein the media comprises a roll of media, and wherein the method further comprises the step of feeding the roll of media from an input roll to a printing device and from the printing device to an output roll.

20. The method of claim 17 wherein the media comprises a plurality of sheets, and wherein the method further comprises delivering each of the plurality of sheets to a stack of sheets after the image and the at least one patch of clear marking material are printed on the sheet.

* * * * *